United States Patent [19]
Taft

[11] Patent Number: 5,257,858
[45] Date of Patent: Nov. 2, 1993

[54] INBOARD TRACK JOINT RETENTION APPARATUS

[75] Inventor: Morris E. Taft, Metamora, Ill.

[73] Assignee: Caterpillar Inc., Peoria, Ill.

[21] Appl. No.: 970,457

[22] Filed: Nov. 2, 1992

[51] Int. Cl.[5] .............................................. B62D 55/21
[52] U.S. Cl. ............................. 305/58 PC; 305/58 R
[58] Field of Search .................... 305/11, 14, 39, 58 R, 305/58 PC, 59

[56] References Cited

U.S. PATENT DOCUMENTS

| | | | |
|---|---|---|---|
| 4,150,856 | 4/1979 | Hakkenberg et al. | 305/11 |
| 4,163,589 | 8/1979 | Fox et al. | 305/14 |
| 4,618,190 | 10/1986 | Garman et al. | 305/39 |
| 4,639,995 | 2/1987 | Garman et al. | 29/402.08 |
| 5,069,509 | 12/1991 | Johnson et al. | 305/58 R |
| 5,183,318 | 2/1993 | Taft et al. | 305/58 R |

Primary Examiner—Russell D. Stormer
Attorney, Agent, or Firm—O. Gordon Pence

[57] ABSTRACT

Joint retention apparatus is disclosed for preventing axial end-play movement of the outboard end collars of track links on the opposite ends of the track pins of track for track-type vehicles. The retention apparatus is located inboard of the pin ends so as not to be exposed to wear from contact with the track guides of the vehicle and includes a pin groove formed about the pin, a link groove located at the inner end of the pin bore through outboard end collar of the link and a retention ring. The retention ring is transformed into a formed-in-place retainer when it is extruded into the retainer cavity formed by the pin and link grooves as the link is pressed onto the end of the pin during the track assembly process with the use of a track press.

4 Claims, 3 Drawing Sheets

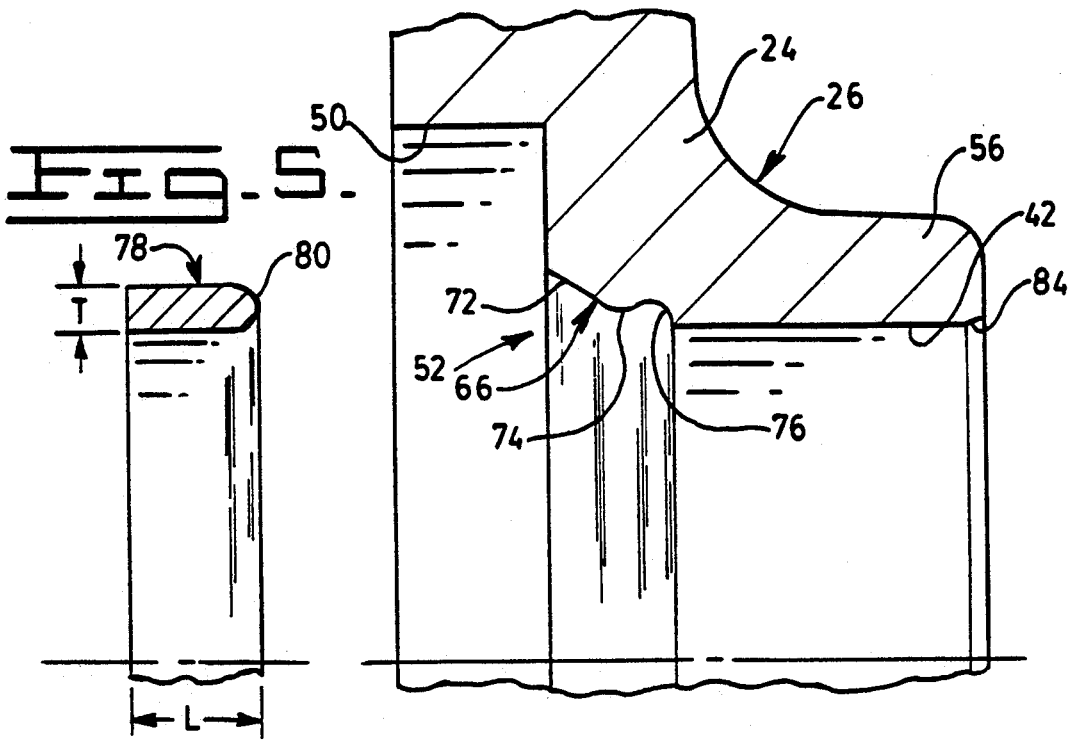
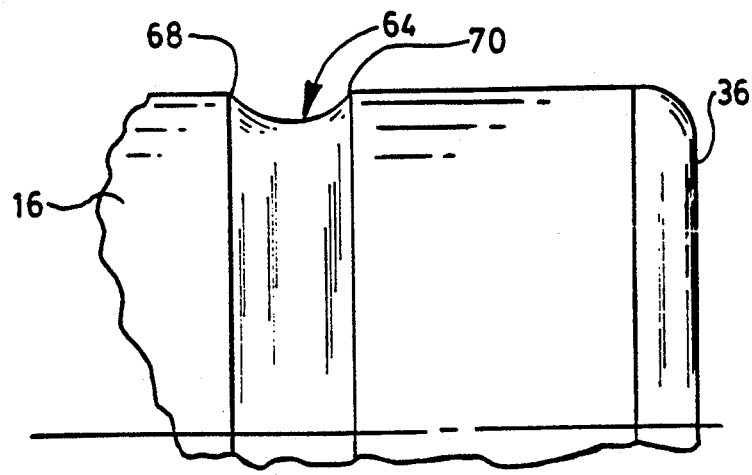

INBOARD TRACK JOINT RETENTION APPARATUS

TECHNICAL FIELD

This invention relates generally to apparatus for retaining a joint of an endless track for crawler-type vehicles and more particularly to such joint retention apparatus located inboard of the track pin end.

BACKGROUND ART

U.S. Pat. No. 4,618,190 issued on Oct. 21, 1986 to James A. Garman et al and assigned to the assignee hereof for Track Joint Retaining Apparatus discloses a formed-in-place retention ring that is in use today to prevent joint end play. The retention rings of this retaining apparatus are located at the exposed ends of the pin. This apparatus is quite acceptable for track that is rail guided, but not for track that is pin guided. In rail guided track, track guides contact the sides of the rail surfaces of the track links to prevent the laterally shifting of the track during turns or when the tractor is operating on side slopes. Conversely, in pin guided track, the track guides are higher on the track and contact the ends of the pins and the pin bosses on the links. The sliding contact between the track and the track guides, however, wear off the ends of the pins and pin bosses. As a consequence, the use of the retaining apparatus of the type disclosed in the aforementioned U.S. Pat. No. 4,618,190 is not acceptable for pin guided track as they would be worn away with the ends of the pins and pin bosses. Thus, the retention ability of the retaining rings would be prematurely destroyed and joint end play would then develop.

DISCLOSURE OF THE INVENTION

In accordance with one aspect of the present invention, joint retention apparatus is provided for preventing axial end-play movement of a link on a pin of a track joint. The link has a through bore of a size to permit an end of the track pin to be press fittably assembled therein. The bore has an exposed outboard end and an opposite inboard end. The joint retention apparatus includes a retainer cavity and a soft metal retention ring and is located adjacent the inboard end of the pin bore and remote from the outboard end. The retention ring is extruded into said retainer cavity during the assembly of the link onto the pin to form a formed-in-place retainer.

BRIEF DESCRIPTION OF THE DRAWINGS

FIG. 3 is an enlarged cross-sectional view the outboard end collar of one of the links of the track illustrating the preferred configuration of a link groove that forms a portion the retainer cavity for the retention apparatus.

FIG. 4 is an enlarged fragmentary view of a portion of a pin of the joint illustrating a pin groove forming another portion of the retainer cavity.

FIG. 5 is an enlarged fragmentary cross-sectional view of the retention ring by itself.

BEST MODE FOR CARRYING OUT THE INVENTION

Figure 1:
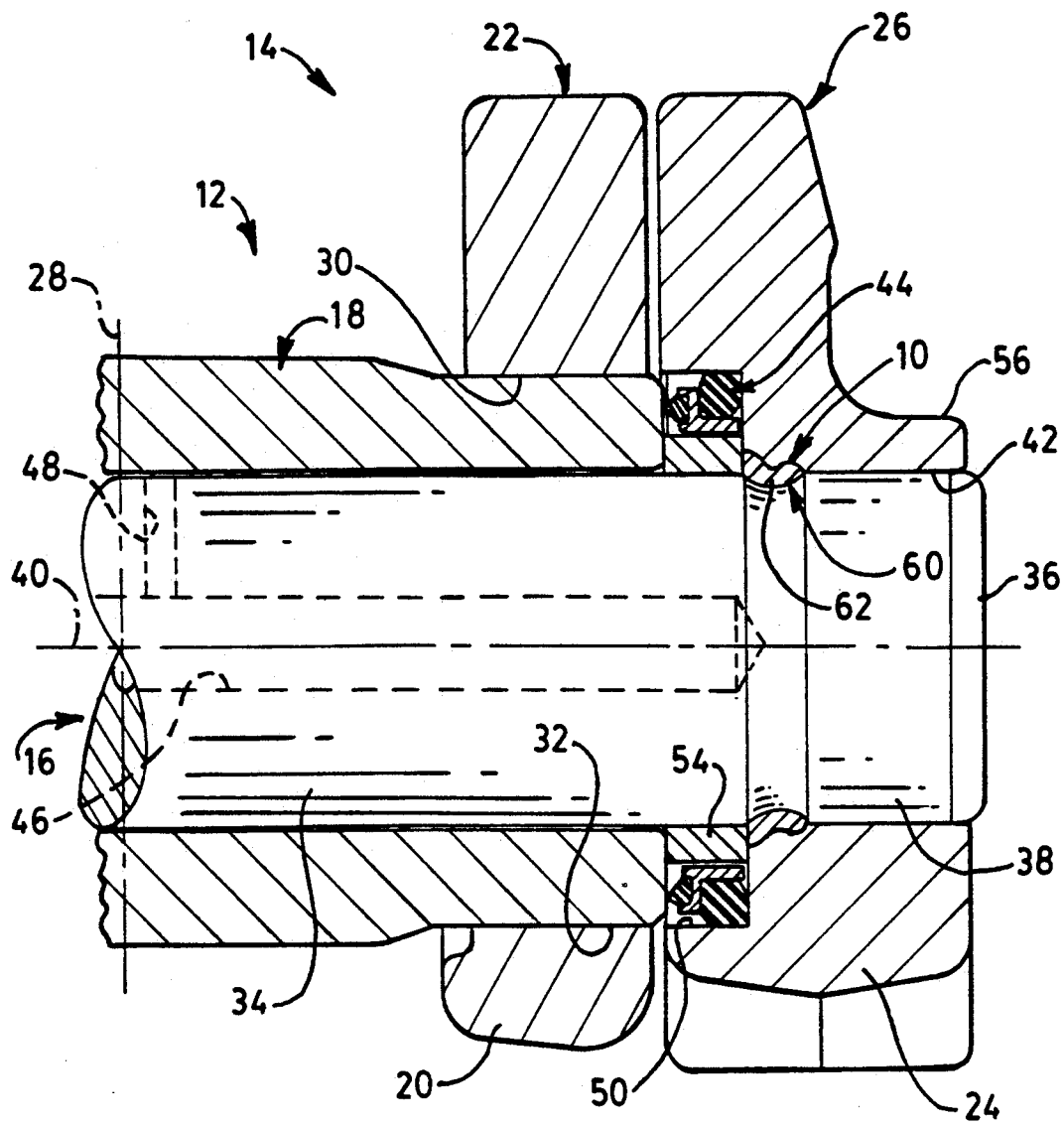
FIG. 1 is a fragmentary cross-sectional view of one end of a track joint for an endless track illustrating joint retention apparatus embodying the principals of the present invention.

Referring more particularly to FIG. 1 of the drawings, joint retention means or apparatus embodying the principals of the present invention is generally depicted at 10 for preventing axial end-play movement in a joint 12 of an endless track 14 of the type used on a crawler-type vehicle, not shown. As depicted in FIG. 1, joint 12 includes a pin 16, a hollow bushing 18, an inboard end collar 20 of a first right-hand link 22 and an outboard end collar 24 of an adjoining second right-hand link 26. The inboard end collar 22 has a bore 30 of a size sufficient to enable the inboard end collar 20 to be press fitted onto an end 32 portion of the bushing 18. The pin 16 has a mid-portion 34, an end 36 and an end portion 38. The pin mid-portion 34 is of a size to be received within the hollow bushing 18 and freely pivot relative to the bushing about a transverse axis 40.

The outboard end collar 24 of the second link 26 has a bore 42, which is of a size sufficient to enable the outboard end collar 24 to be press fitted onto the end portion 38 of the pin 16.

It should be noted that only the right-hand half of the joint 12 is being depicted in FIG. 1. Those skilled in the art will appreciate that the unshown left-hand half of the joint 12 that would be to the left of the longitudinal centerline 28 of the track is the mirror image of the right-hand half. Such left-hand half similarly includes a pair of left-hand links, not shown, that are mounted on their respective opposite pin and bushing end portions, which are likewise not shown. The above assemblage is successively repeated with the next adjoining links, pins and bushings to complete the construction of the endless track 14.

While not intended to be so limited, the embodiment of the present invention to be hereinafter described is particularly well suited for use in an endless track 14 which is sealed and lubricated. A track of this configuration normally has each joint provided with a pair of seals, one of which is shown at 44, and a lubricant reservoir, such as a sealed bore 46 in the pin 16. Lubricant contained in such reservoir 46 is distributed to the pin-bushing interface by a cross-hole 48. Seal 44 is mounted in a counterbore 50 located at an inboard end 52 of the bore 42 of the outboard end collar 24 (see FIG. 3). A thrust ring 54 is also disposed in the counterbore 50 so that all of the joint components can be pushed together into abutment with essentially zero gap between the joint components without crushing the seal 44 when the joint 12 is its fully assembled condition, as depicted in FIG. 1. In other words, the outboard link end collars 24 are in close abutting contact with adjacent ends of the thrust rings 54, while the other ends of the thrust rings 54 abut the adjacent opposite ends of the bushing 18. As a consequence, there is essentially no axial end play in the joint 12 after the assemblage is completed.

The joint retention apparatus 10 of the present invention is principally directed toward maintaining the above-described abutting relationship during a life of operation of the crawler-type vehicle, but is advantageously located in a protected location so as not to be exposed to wear due to contact with track guides (not shown) with the pin end 36 and a pin boss 56 on the outboard end collar 24. The apparatus 10 includes right-hand and left-hand formed-in-place retainers 62 and retainer cavities 60 in each joint 12. However as the left-hand retainer and retainer cavity is the mirror image of the right-hand, like the other joint components, only the right-hand one of such retainers and cavities will be hereinafter described in detail, it being understood that such description applies as well to the left-hand retainer and cavity, which are not shown.

As best shown in FIGS. 3 and 4, a retainer cavity 60 is defined by a shallow concave groove 64 formed about the pin 16 and undulating groove 66 in the outboard end collar 24 of the second link 26. The pin groove 64 is generally arcuate in shape, but, more preferably, is a curve created by two or more radii that become progressively smaller from an inner end 68 to an outer end 70 of the pin groove 64, as best shown in FIG. 4. The link groove 66 is formed at the inner end 52 of the pin bore 42 and has a ramped lead-in portion 72, a convex center portion 74 and a concave end portion 76. When the outboard end collar 24 is in its assembled position, as shown in FIG. 1, the link groove 66 is in axial registry with the pin groove 64 to form the retainer cavity 60.

Figure 2:
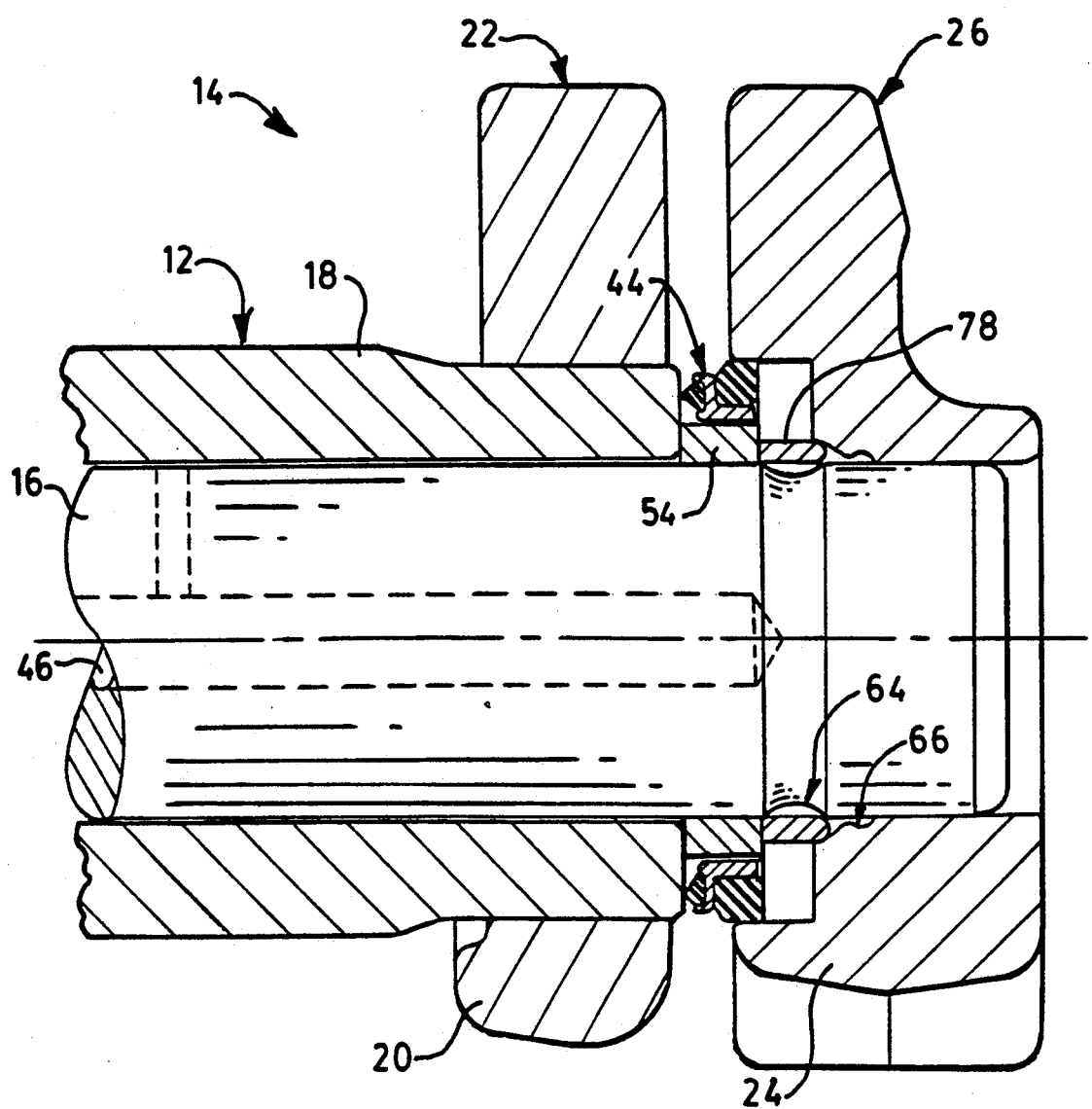
FIG. 2 is a cross-sectional view similar to FIG. 1, but with the joint in a partially assembled condition and illustrating a retention ring prior to its extrusion into a retainer cavity.

Prior to being extruded into the retainer cavity, as will be hereinafter explained, the form-in-place retainer 62 is a retention ring 78 of the shape depicted in FIGS. 2 and 5. The retention ring 78 is of a soft metal. By soft metal it is meant that the ring has a hardness that is less than the other components of the track and, in particular, the links 22,26, pin 16, and thrust rings 54, but not so soft as to be incapable of performing its job as a retainer. In this regard, the ring 78 is preferably made of a mild steel, such as a wrought steel, so as to be readily formable under the high forces exerted by a track press, but yet have sufficient strength to withstand the considerable forces exerted on it during track operation without yielding. The retention ring 78 may be made of inexpensive tube stock that is cut to length. The ring 78 is provided with a rounded or bullet shaped nose 80 at one end to assist in the initiation of the deformation of the ring into its formed-in-place retainer configuration and to match the bulbous end of the cavity 60. The ring may be either a solid cylindrical ring or a split ring. A split ring is advantageous in that less force is required to extrude such a split ring into the cavity. Also, such a split ring is more accommodating of dimensional variations in the components of the track due to manufacturing tolerances.

INDUSTRIAL APPLICABILITY

The retention ring 78 of the present invention is transformed into the formed-in-place retainer 62 during and by means of the assembly process of the track chain with a conventional track press typically used to press the track links onto the ends of the bushing and onto the ends of the pins. In this regard, the inboard end collar 20 of a first right-hand link 22 is first pressed onto the end portion 32 of the bushing 18. Then, the pin 16 is inserted through the bushing 18 and the thrust ring 54 is slid over the pin 16. The thrust ring 54 is followed by the retention ring 78, which is likewise slid into place on the pin. Next, the seal 44 is installed in the counterbore 50 of the outboard end collar 24 of the second right-hand link 26. After these steps are completed, the outboard end collar is pressed onto the end portion 38 of the pin 16. As the outboard end collar 24 is being pressed onto the pin by means of the track press, the ramped portion 72 of the link groove 66 will engage the rounded nose 80 of the retention ring 78 and begin to force the end of the ring 78 downward into the pin groove 64. As the link continues its inward movement, the ring 78 is progressively forced down into, and then back out of the pin groove 64 into the concave end portion 76 of the link groove 66. In practical terms, the ring 78 is trampled by the link 26 as it is pressed onto the pin 16.

To achieve the desired formed-in-place retainer 62, several general parameters should be kept in mind in configuring the retention ring 78 and the retainer cavity 60. First, retention ring 78 also has an inside diameter that is slightly greater than the diameter of the pin 16 to ensure that it will slip over the pin. The outside diameter of the ring 78 is less than the mouth of the link groove 66 to ensure initial engagement of the ring 78 with the ramped lead in portion 72 of the link groove 66. Second, the length "L" of the retention ring 78 and the overall length of the cavity 60 should be about equivalent to each other. Likewise, the width of the cavity 60, formed by the gap 82 between the pin groove 64 and the link groove 66 should be uniform and substantially equal to the thickness "T" of the retention ring 78, except at the mouth of the lead-in portion 72, which is preferably slightly greater than the thickness of the ring 78. Keeping the gap 82 equal to the thickness of the ring facilitates the ease of extrusion of the ring 78 into the cavity 60, while ensuring tight contact between the ring 78 and the cavity walls with minimum working of the ring material.

Of more importance than mere size of the ring and cavity is their volumetric relationship. In this regard, the material volume of the ring 78 may be equal to, but not greater than the available volume of the cavity 60. This is important because a ring 78 of greater volume than its cavity 60 would prevent the full assembly of the link 26 onto the pin 16 where it abuts the thrust washer 54 as indicated above.

Once the retention ring 78 is extruded into the shape of the formed-in-place retainer 62 in the manner described above, such retainer 62 has a hook-like configuration where the end of the retainer 62 is captured in the concave end portion 76 of the link groove 66, which is effective in preventing axial movement of the link 26 on the pin 16, thus eliminating end-play in the joint 12.

As is apparent, the retention apparatus 10 is located at the inboard end of the bore 42 and, thus, is remote from an exposed outboard end 84 of the bore 42, as well as the pin boss 56. As a consequence, there is no risk of the retention apparatus 10 being worn away along with the pin end 36 and the pin boss 56 through their sliding contact with the track guides during operation of the track-type vehicle.

Other aspects, objects and advantages of the present invention may be ascertained from a study of the drawing, the disclosure, and the appended claims.

I claim:

1. In a track joint having a track link and a track pin, said link having a through bore of a size to permit an end of the track pin to be press fittably assembled therein, said bore having an exposed outboard end and an opposite inboard end, the improvement comprising:

joint retention means for preventing axial end-play movement of the link on the pin, said retention means including a retainer cavity and a soft metal retention ring and being located adjacent said inboard end of said pin bore and remote from said outboard end, said retention ring being extruded into said retainer cavity during the assembly of said link onto said pin to form a formed-in-place retainer.

2. The track joint of claim 1 said retainer cavity includes a concave groove formed about said pin and an undulating groove in said link located at the inboard end of said bore, said undulating groove being in registry with said pin groove when said link is in its assembled position on the pin and having a ramped lead-in portion, convex center portion and concave end portion.

3. In a track joint having a track link mounted on a track pin and a formed-in-place retainer for preventing axial movement of said link on said pin, said link having a through pin bore for receiving said pin, said bore having an exposed outboard end and an opposite inboard end, the improvement wherein said formed-in-place retainer comprises:

a retainer cavity located adjacent said inboard end of said pin bore and remote from said outboard end thereof, said retainer cavity including a concave groove formed about said pin and an undulating groove in said link located at the inboard end of said bore, said undulating groove being in registry with said pin groove when said link is in its assembled position on the pin and having a ramped lead-in portion, a convex center portion and a concave end portion; and a soft metal retention ring, said retention ring being extruded into said retainer cavity during the assembly of said link onto said pin to form said formed-in-place retainer.

4. The track joint of claim 3 wherein said retention ring has a generally cylindrical configuration having an inside diameter that is only slightly greater than the outside diameter of said pin and an outside diameter that is less than the opening of the undulating link groove and has a rounded nose at one end thereof.

* * * * *